US006625366B2

(12) United States Patent
Ruschin et al.

(10) Patent No.: US 6,625,366 B2
(45) Date of Patent: Sep. 23, 2003

(54) POLYMER ON SUBSTRATE WAVEGUIDE STRUCTURE AND CORRESPONDING PRODUCTION METHOD

(75) Inventors: Shlomo Ruschin, Herzlia (IL); Tali Hurvits, Ramat Hasharon (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 114 days.

(21) Appl. No.: 09/785,488

(22) Filed: Feb. 20, 2001

(65) Prior Publication Data

US 2002/0136517 A1 Sep. 26, 2002

(51) Int. Cl.[7] .................................................. G02B 6/10
(52) U.S. Cl. ............................... 385/129; 385/132
(58) Field of Search ............................... 385/129–132

(56) References Cited

U.S. PATENT DOCUMENTS

| | | | |
|---|---|---|---|
| 4,834,480 A | | 5/1989 | Baker et al. |
| 5,037,168 A | * | 8/1991 | Young et al. ............ 385/130 |
| 5,094,553 A | * | 3/1992 | Yakymyshyn et al. ..... 359/900 |
| 5,143,577 A | * | 9/1992 | Haas et al. ............. 385/132 |
| 5,444,805 A | | 8/1995 | Mayer |
| 5,526,454 A | | 6/1996 | Mayer |
| 6,022,671 A | * | 2/2000 | Binkley et al. ........... 430/320 |
| 6,037,105 A | | 3/2000 | You et al. |

FOREIGN PATENT DOCUMENTS

EP          445527 A2 *  9/1991  ............ G02B/6/12

OTHER PUBLICATIONS

*Polymers For Lightwave And Integrated Optics, Technology And Applications*, Lawrence A. Hornak—Editor, M. Dekker, New York 1992.
*Introduction To Glass Integrate Optics*, Iraj S. Najafi, Artech House, Boston 1992.
Tunable Polymer Optical Add/Drop Filter for Multiwavelength Networks (C. Kostrzewa et al., IEEE Photonics Technology Letters. vol. 9 No. 11 pp. 1487–1489 Nov. 1997).

* cited by examiner

Primary Examiner—Akm E. Ullah
Assistant Examiner—Michelle R. Connelly-Cushwa
(74) Attorney, Agent, or Firm—Mark M. Friedman

(57) ABSTRACT

A waveguide for guiding electromagnetic radiation of a given range of wavelengths includes a transparent substrate made from non-polymer material, preferably glass, into which at least one elongated channel is etched. A polymer material with a higher refractive index than that of the substrate is deposited within, and extends along, the channel, so as to define a waveguide. The regions of the substrate adjacent to the ends of the channel are preferably treated, such as by ion-exchange, to form secondary waveguide portions, optically coupled to the polymer waveguide, for input and output optical coupling with the waveguide. Also disclosed is a production method for such waveguides.

19 Claims, 4 Drawing Sheets

Air

Polymer overlay

Glass substrate with
etched channel

POLYMER ON SUBSTRATE WAVEGUIDE STRUCTURE AND CORRESPONDING PRODUCTION METHOD

FIELD AND BACKGROUND OF THE INVENTION

The present invention relates to waveguides and, in particular, it concerns a waveguide structure of polymer material on a non-polymer substrate and a corresponding production method.

Optical waveguides are structures that constrain or guide the propagation of light along a path defined by the physical construction of the waveguide. The dimensions of the waveguide in the direction in which the light is confined are on the order of the wavelength of the light. Such optical waveguides comprise a region of high refractive index in which most of the optical field of the light is located surrounded by regions of lower refractive index. Typically, an optical waveguide comprises a three-layer or sandwich structure comprising a substrate, a middle layer, and a top layer or cover. The top layer is frequently air. The index of refraction is largest in the middle layer within which the light is guided.

Optical waveguides may be constructed as a pattern of strips or channels on a substrate. The width and depth of the channels are on the order of the wavelength of the light to be guided, thus confining the propagation of light along the channels.

Channel waveguides may be made by a variety of different techniques. One of the simplest and most effective methods for making channel waveguides in glass is a technique known as ion exchange. According to this technique, a base glass containing, for example, sodium ions is covered with a metal mask. The glass may typically be an alkali aluminoborosilicate or a soda-lime glass. The metal mask covers the surface of the base glass except for the places where narrow channels are desired. The base glass covered with the mask is then immersed in a molten salt bath. The molten salt bath consists of a source of single valence ions, such as alkali metal, thallium or silver ions, which diffuse into the glass in the uncovered regions and replace the sodium ions at the glass surface. This results in a pattern of channels in the glass wherein the channels have higher density and altered electronic polarizability compared to surrounding regions. Both of these effects lead to a higher index of refraction, and thus to ion-exchanged channel waveguides in the glass substrate. In some cases, an electric field is applied to the glass sample during the ion-exchange process, in order to bury the waveguide below the surface of the sample.

Another technique used to form waveguides is photolithography. According to this technique, a suitable optical material is dissolved in a solvent, spin-coated onto a substrate, and exposed to ultraviolet light through a photomask. In a typical negative photolithographic process, the ultraviolet light causes the exposed portions of optical material to polymerize and harden. After this, the unpolymerized portions of the optical material are washed away to form the waveguide channels. In a typical positive photolithographic process, the ultraviolet light causes the exposed portions of the optical material to decompose while the unexposed portions harden. The decomposed portions are then washed away. In either case, a pattern of raised strips or channels of the optical material is left behind on the substrate.

Much interest has been expressed in waveguides formed from various polymers which offer non-linear and/or electrically controllable optical properties. Polymers also offer advantages of easy deposition and versatility. Nevertheless, applications of polymer waveguides have not yet achieved their full potential. This is believed to be largely due to the limitations of the existing production techniques which tend to produce rough surfaces which lead to unacceptably high energy losses, both along the length of the waveguides and particularly at input and output interfaces.

One approach to avoiding the need for photolithography when using polymer materials is proposed by U.S. Pat. No. 4,834,480 to Baker et al. This document proposes composite waveguides in which relatively shallow channels are defined in the surface of a glass substrate by ion-exchange and a uniform layer of polymer material is then deposited over the entire surface. The dimensions and properties are chosen such that light propagation can only occur via modes which overlap both the ion-exchange channels and the polymer layer, thereby ensuring that the transmission is affected by the properties of the polymer. This approach, however, is far from ideal for a number of reasons. First and foremost, the electromagnetic modes of this combined structure carry relatively small amounts of power inside the polymer. As a result, the desired non-linear properties of the waveguide are greatly reduced. In addition, the structure of the modes of this combined structure is rather unusual. This makes it difficult to achieve efficient coupling of the structure at an interface with a conventional single-mode optical fiber.

Finally, reference is made to an article entitled "Tunable Polymer Optical Add/Drop Filter for Multiwavelength Networks" (C. Kostrzewa et al., IEEE Photonics Technology Letters, Vol. 9, No. 11, pp. 1487–1489, November 1997) which refers to a waveguide structure in which a silicon substrate with grooves formed by RIE was coated with polymer. This approach offers various advantages by employing RIE of the substrate to define the path of the waveguide. However, no solution is offered for achieving efficient coupling of such a waveguide to input or output fibers.

There is therefore a need for a waveguide production technique which would cheaply and simply produce polymer waveguides while reducing problems of rough waveguide surfaces. It would also be highly advantageous to provide a waveguide structure which would combine the advantageous properties of both polymer and ion-exchange-in-glass waveguides.

SUMMARY OF THE INVENTION

The present invention is a waveguide structure of polymer material on a non-polymer substrate and a corresponding production method.

According to the teachings of the present invention there is provided, a waveguide structure comprising: (a) a substrate made from non-polymer material which is substantially transparent with a refractive index $n_1$ for electromagnetic radiation within at least one range of wavelengths, the substrate having an upper surface, at least one elongated channel being etched in the surface of the substrate, the elongated channel terminating at an end wall; and (b) a polymer material deposited within, and extending along substantially the entire length of, the at least one channel so as to be optically coupled to the end wall, the polymer material being substantially transparent with a refractive index $n_2$ for electromagnetic radiation within the range of wavelengths, $n_2$ being greater than $n_1$ such that the polymer material defines a waveguide.

According to a further feature of the present invention, the elongated channel has at least one terminal portion adjacent to the end wall, the terminal portion defining a extension direction, wherein a region of the substrate extending from the end wall in the extensional direction is processed so as to exhibit a refractive index greater than $n_1$, thereby defining a secondary waveguide portion optically coupled to the waveguide.

According to a further feature of the present invention, the substrate includes a lateral surface located so as to delimit the secondary waveguide portion, the lateral surface being polished to a roughness of no more than about 0.1 μm.

According to a further feature of the present invention, the channel has a channel depth and wherein the polymer material is deposited within the channel as a layer having a thickness less than the channel depth.

According to a further feature of the present invention, the non-polymer material is selected from the group comprising: a glass material and a crystalline material.

According to a further feature of the present invention, the elongated channel has a substantially rectangular cross-section.

According to a further feature of the present invention, a cross-section of the elongated channel exhibits a concavely-rounded shape.

According to a further feature of the present invention, there is also provided a coating layer deposited over both the surface of the substrate and the polymer material, the coating layer having a refractive index smaller than $n_2$.

There is also provided according to the teachings of the present invention, a method for producing a polymer waveguide on a non-polymer substrate, the method comprising: (a) etching at least one channel in a surface of the substrate, the channel terminating at an end wall within the substrate; and (b) depositing a polymer material within the at least one channel so as to form a waveguide.

According to a further feature of the present invention, the etching is performed to form a given channel depth, and wherein the depositing is performed so as to form a layer of the polymer material having a thickness less than the given channel depth.

According to a further feature of the present invention, the etching is performed via a mask defining the at least one channel.

According to a further feature of the present invention, the etching is performed using a wet etching process.

According to a further feature of the present invention, the etching is performed using a dry etching process.

According to a further feature of the present invention, the depositing is performed using a substantially uniform deposition process.

According to a further feature of the present invention, the depositing is performed using a spin-coating deposition process.

According to a further feature of the present invention, at least one region of the substrate is processed through an ion exchange process so as to form a secondary waveguide adjacent to the at least one channel.

According to a further feature of the present invention, a layer of coating material is deposited over both the surface of the substrate and the polymer material.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
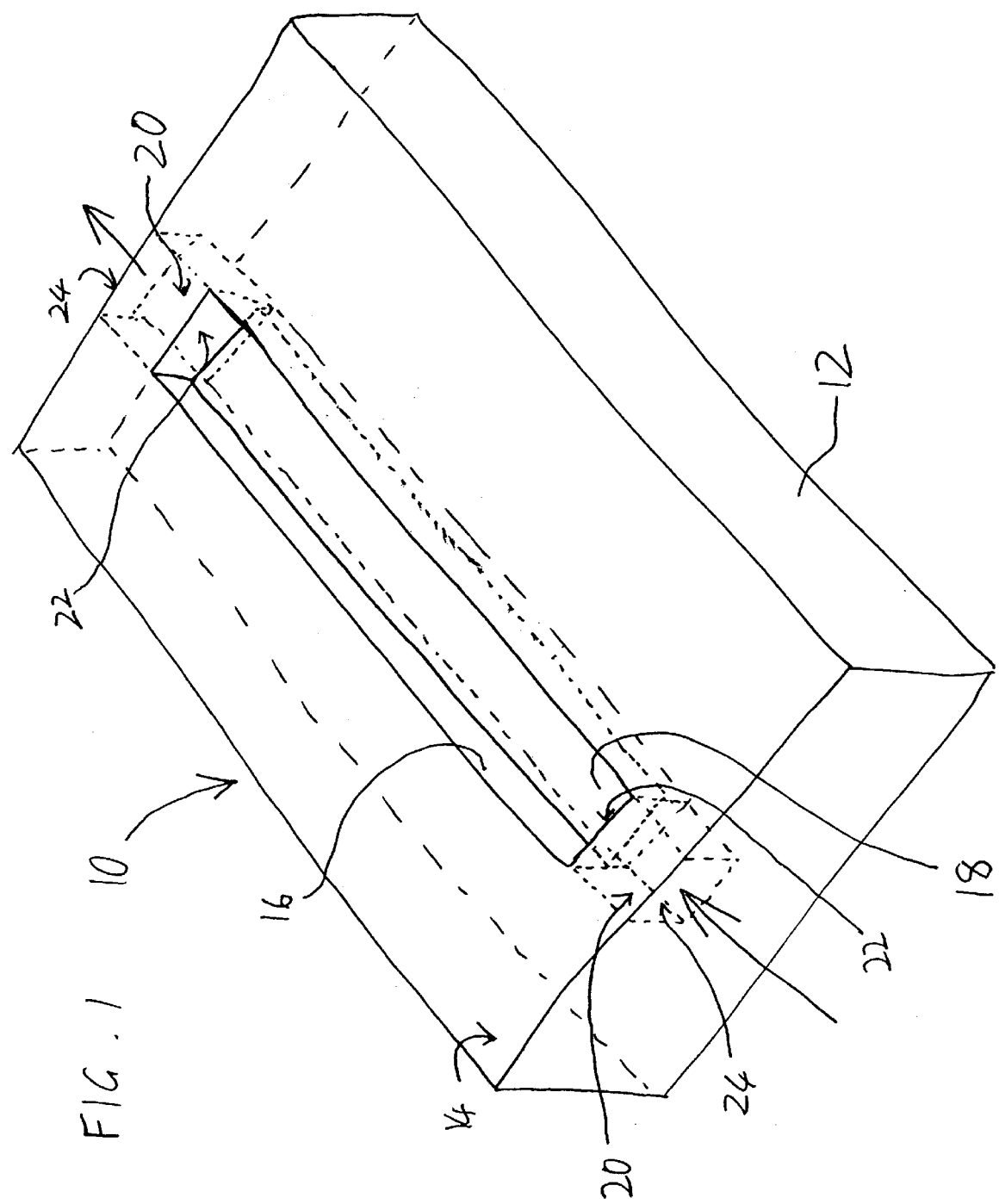
FIG. 1 is a schematic isometric view taken along the length of a waveguide, constructed and operative according to the teachings of the present invention.
Figure 2:
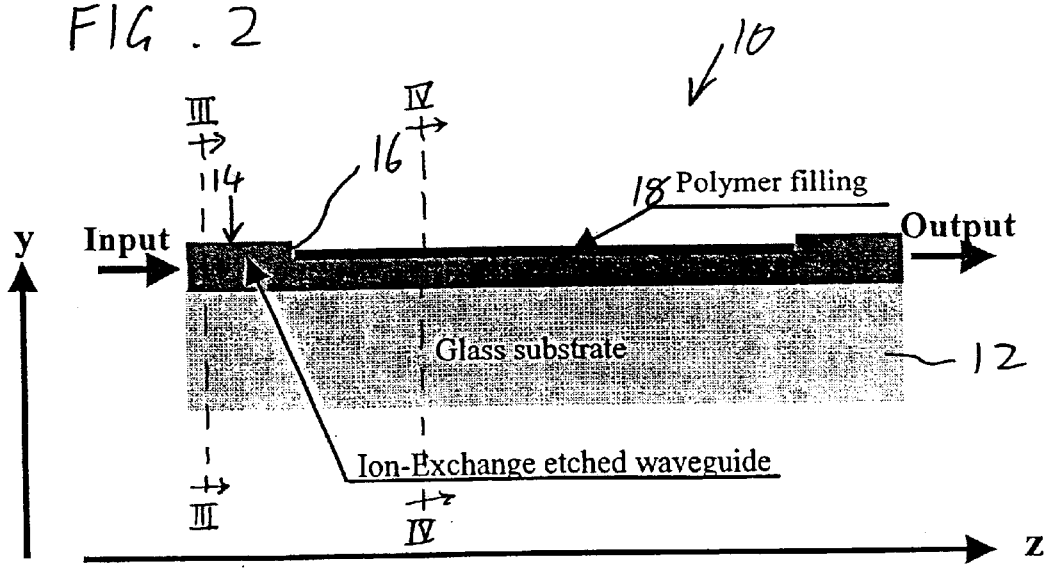
FIG. 2 is a schematic longitudinal cross-sectional view taken along the length of the waveguide of FIG. 1.
Figure 3:
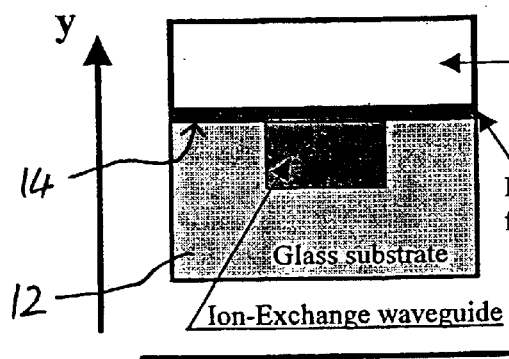
FIG. 3 is a schematic cross-sectional view taken along the line III—III of FIG. 2.
Figure 4:
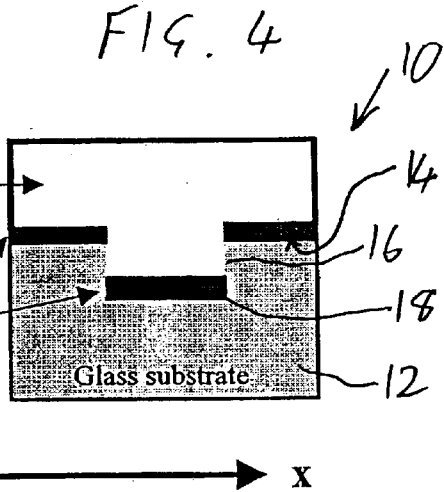
FIG. 4 is a schematic cross-sectional view taken along the line IV—IV of FIG. 2.

The present invention is a waveguide structure of polymer material on a non-polymer substrate and a corresponding production method.

The principles and operation of waveguide structures and corresponding production methods according to the present invention may be better understood with reference to the drawings and the accompanying description.

Referring now to the drawings, FIGS. 1–4 show a waveguide structure, generally designated 10, constructed and operative according to the teachings of the present invention.

Generally speaking, waveguide 10 includes a substrate 12 made from non-polymer material which is substantially transparent with a refractive index $n_1$ for electromagnetic radiation within at least one range of wavelengths. Substrate 12 has an upper surface 14 into which at least one elongated channel 16 is etched. A polymer material 18 is deposited within, and extends along substantially the entire length of, channel 16. Polymer material 18 is substantially transparent for electromagnetic radiation within the range of wavelengths and exhibits a refractive index $n_2$ greater than $n_1$, such that the polymer material defines a waveguide.

It will be readily appreciated that waveguide 10 combines many of the advantages of both glass and polymer waveguides. Firstly, since the polymer material is deposited against the smoothly etched internal surfaces of channel 16, the polymer conforms to the glass surfaces thereby achieving a much higher degree of smoothness than is generally achieved by direct photolithography of the polymer material. Similarly, input and output to and from the waveguide are preferably achieved through a region of the substrate adjacent to the ends of channel 16, thereby facilitating the production of highly polished interface surfaces. At the same time, the radiation propagates primarily through the polymer material, thereby making available the full range of non-linear, electro-optic, thermo-optic and/or other controllable properties of polymer waveguides. These and other advantages of waveguide 10 will be better understood from the following description.

Turning now to the features of waveguide 10 in more detail, in a preferred implementation, input and/or output interfaces with waveguide 10 are provided by secondary waveguide portions 20 formed by processing a region of substrate 12 extending beyond an end wall 22 of channel 16 in its extensional direction to produce a region of locally increased refractive index. In a particularly preferred case of a glass substrate 12, secondary waveguide portions 20 are preferably formed by ion-exchange processing.

It should be noted that, although illustrated here schematically as a straight section of waveguide, waveguide 10 may be implemented in substantially any desired shape. Clearly, in each case, the secondary waveguide portions 20 are deployed so as to provide a continuation of the primary direction of propagation of radiation in a terminal portion of the polymer waveguide adjacent to end wall 22. In geometrical terms, the secondary waveguide portion is typically formed at least in a region adjacent to end wall 22 which is a continuation of an extension direction of the terminal portion of channel 16 closest to end wall 22. Thus secondary waveguide portions 20 effectively form a continuation of the waveguide beyond channel 16.

End wall 22 is shown here as a flat end wall substantially perpendicular to the direction of propagation of radiation within the waveguide. It should be noted, however, that this configuration may be varied in a number of ways, as will be clear to one ordinarily skilled in the art, to alter the coupling properties between the polymer material 18 and secondary waveguide portions 20. For example, various tapered channel shapes offer advantages for a low-loss transition between the different waveguide structures.

The provision of secondary waveguide portions 20 is particularly advantageous for efficient coupling of waveguide 10 with various inputs and outputs. Specifically, the input and output interfaces are provided by lateral surfaces 24 located so as to delimit secondary waveguide portions 20. Since surfaces 24 are formed on the substrate 12, it is typically possible to achieve a degree of smoothness or polishing which could not be achieved at an interface directly with polymer material 18. This is particularly true in a preferred case of a glass substrate which can readily be highly polished to sub-micron smoothness. In most preferred cases, the lateral input and output surfaces 24 are ground to a roughness not exceeding about 0.1 $\mu$m (which may be achieved by the use of grinding powders). For particularly high performance (low-loss) coupling, etching techniques are preferably used to achieve a roughness not exceeding about 0.01 $\mu$m.

Although thought to be particularly advantageous with a glass-based substrate 12, it should be appreciated that the present invention may be implemented to advantage with a wide range of substrate materials for which suitable polishing technology exist. The substrate material is preferably either a crystalline material or of glass nature. An additional example of a substrate material particularly suitable for implementing the present invention is Lithium Niobate, for which waveguide technology is well developed.

Optionally, if desired, the entire waveguide structure may be coated by a coating layer (not shown) deposited over both the surface of the substrate and the polymer material. In this case, in order to preserve the waveguide properties, the coating layer is chosen to have a refractive index smaller than both $n_2$ and the refractive index of the ion-exchange waveguide. Polymer materials are preferred for coating layer due to the convenience of application by spin-coating or dipping.

It will be noted that elongated channel 16 may assume various different shapes. Preferred cross-sectional shapes include, but are not limited to, a substantially rectangular cross-section as shown here, and a concavely curved cross-section. Particularly where wet etching techniques are used, the cross-sectional shape of the channel is typically somewhat rounded so as to exhibit a concavely curved shape (see FIGS. 7G and 7H below). This smoothing effect adds to the surface smoothness of the etched channel and hence to the smooth outer surface of the polymer material which is subsequently deposited thereon. The result is a particularly high quality and low loss waveguide structure.

Figure 5A:
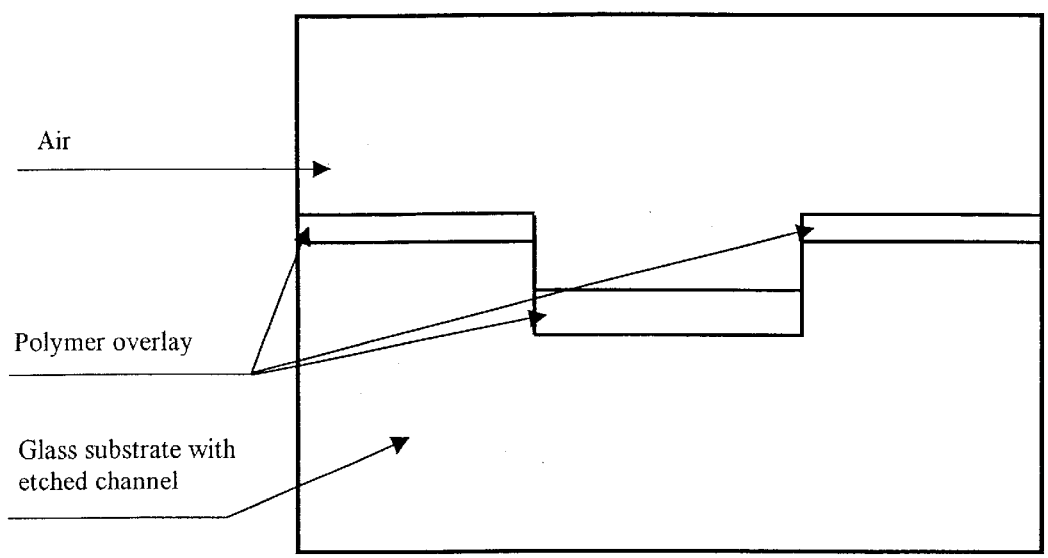
FIG. 5A is a computer-generated contour map, equivalent to FIG. 4, used for a computer simulation of the properties of the waveguide of FIG. 1.
Figure 5B:
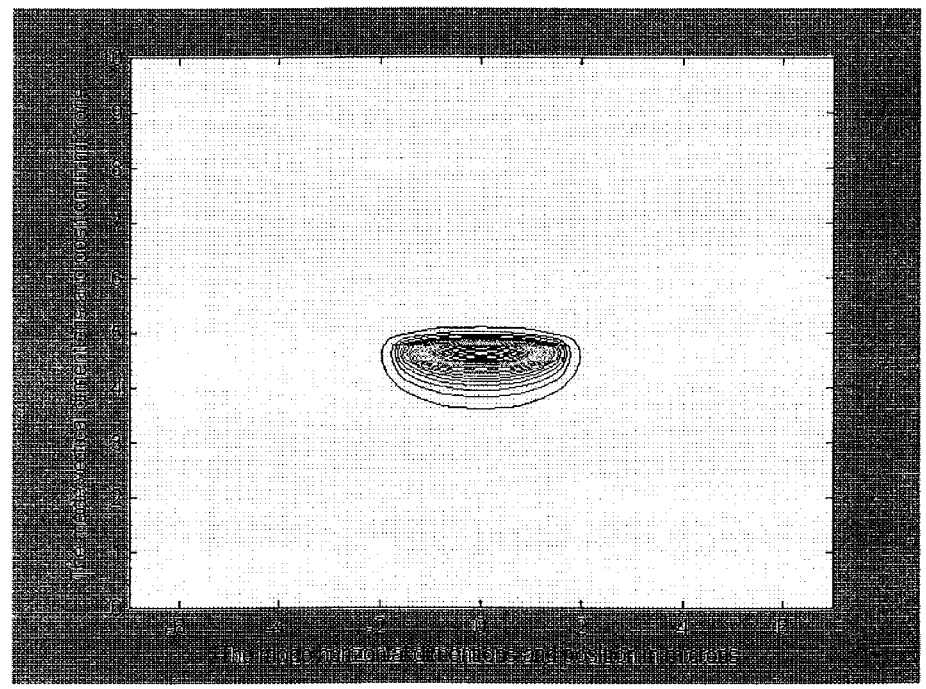
FIG. 5B is a computer generated simulation of an intensity map generated for radiation propagating along the waveguide structure of FIG. 1.

Turning now to FIGS. 5A and 5B, these show a computational model of waveguide structure 10 and the resulting simulated radiation intensity distribution, respectively. The calculations were based on the basis of the following parameters: wavelength $\lambda$=0.8 $\mu$m; polymer thickness inside etched channels $d_1$=0.35 $\mu$m; polymer thickness outside etched channel $d_2$=0.3 $\mu$m; depth of etched channel $d_3$=1 $\mu$m. The refractive indices were taken as $n_1$=1.513 for the substrate and $n_2$=1.683 for the polymer. The simulations were produced using software commercially available under the name BeamProp™ from Rsoft Inc. (USA). As can be seen from FIG. 5B, these parameters result in a single mode waveguide for the given wavelength of radiation.

Turning now to the preferred method of producing waveguide structure 10, in its most general form, this includes etching at least one channel 16 in a surface 14 of the substrate 12, and depositing a polymer material 18 within channel 16 so as to form a waveguide. This may be achieved using a wide range of etching and deposition techniques, as will be appreciated by one ordinarily skilled in the art. Thus, the etching process may be a wet etching process or a dry etching process such as reactive ion etching (RIE). For simplicity of processing, the polymer material may optionally be deposited over substantially the entire surface of the substrate, both within the etched channels and outside them. This facilitates the use of highly efficient deposition techniques such as spin-coating and dipping. In order to avoid energy leakage, the thickness of the polymer layer is preferably kept less than the etched depth of the channels, thereby ensuring that the waveguide remains isolated within the channels. In some cases, the depth of the channels may be chosen to be significantly greater that the intended thickness of polymer material in order to set the depth of the waveguide so as to be convenient for external coupling. The coupling efficiency between the external fiber and the waveguide can be described by:

$$T = \left(2 \cdot \frac{w_g \cdot w_f}{w_g^2 + w_f^2} \cdot \exp\left(-\frac{d^2}{w_g^2 + w_f^2}\right)\right)$$

where T is the transmittance after coupling between the fiber and the waveguide, $w_g$ is the waveguide mode, $w_f$ is the fiber mode and d is the misalignment displacement between the waveguide centers. Thus, it is very valuable to choose the depth such as to enhance alignment for external coupling independent of the thickness of the polymer layer. As a result, in most preferred cases, the depth of the channel is chosen to exceed the thickness of the polymer layer which is deposited therein.

Alternatively, a relatively thick high-index layer may be applied over a relatively shallower channel to form an inverted "ridge waveguide" structure. This is advantageous is certain cases in that it enlarges the mode shape, but renders it more difficult to achieve effective coupling with an ion-exchange waveguide for input and output.

It will be appreciated that deposition of the polymer layer may either be a single step in which the polymer is deposited directly, or may be a two-step process in which it is deposited in a form which requires a subsequent polymerization step. Both of these cases are referred to herein in the description and claims as "depositing a polymer material" which describes accurately the overall process.

Preferably, an ion exchange process is employed to form secondary waveguide portions 20. It is a particularly advantageous feature of certain preferred implementations of the method of the present invention that both the ion exchange process and the etching are performed using a single mask, thereby requiring only a single photolithographic production step and a single vacuum deposition step. The ion exchange waveguide may conveniently be formed along the entire intended waveguide path. The portion of the substrate adjacent to the edge where optical input or output coupling is to be performed is then covered with photoresist to protect it during the etching procedure. A two mask process may be used to achieve additional features, such as tapering of the transitions from the polymer waveguide to the secondary waveguide portions.

Optionally, an additional coating step may be performed to deposit a protective layer of coating material, typically a low refractive index polymer, over both the surface of the substrate and the polymer material.

Thus, a brief summary of a preferred production method according to the present invention is as follows. First, waveguides are diffused into a glass substrate by an ion-exchange process through an Al mask. Then, the first couple of millimeters from the input/output edges are covered with photoresist for protection. Next, without removing the mask, the waveguide pattern is etched in the exposed regions of the ion exchange waveguide. Finally, polymer is spin-coated to at least partially fill the etched channels. The final result is a polymer channel waveguide with ion exchange channel waveguides for in and out coupling. The Al mask may be removed prior to polymer deposition, or may be left until after polymer deposition so as to selectively deposit the polymer material within the channels.

While it is believed that the description thus far is readily enabling to one ordinarily skilled in the art to practice the production method of the present invention, the method will now be further exemplified by a detailed description of a preferred non-limiting example, with reference to FIGS. 6A–6H and 7A–7H.

Figure 6A:
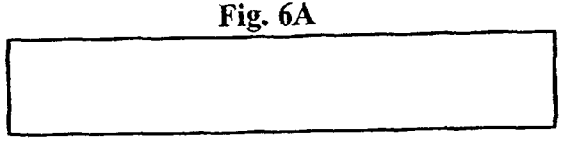
FIGS. 6A–6H are schematic longitudinal cross-sectional views taken through a substrate and illustrating steps in preferred implementation of a method for producing a waveguide, constructed and operative according to the teachings of the present invention.
Figure 6B:
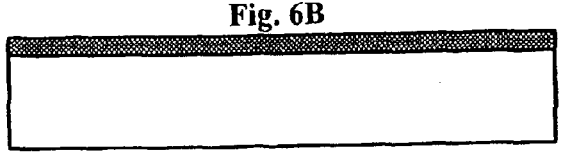
Figure 7A:
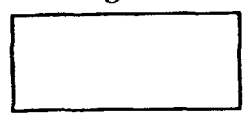
FIGS. 7A–7H are schematic transverse cross-sectional views corresponding to FIGS. 6A–6H, respectively.
Figure 7B:
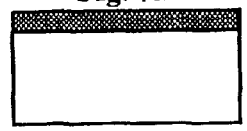

Thus, referring first to FIGS. 6A and 7A, micro-slides of soda-lime glass are cut into pieces to provide the substrate. Typical dimensions for the thickness are about 1 mm. Lateral dimensions are chosen according to the pattern of waveguides to be formed. The substrate is cleaned by standard cleaning procedures. Then, as shown in FIGS. 6B and 7B, Aluminum is evaporated on top of the substrate to form an Al layer.

Figure 6C:
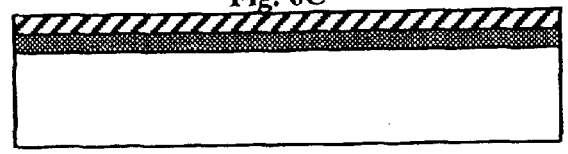
Figure 6D:
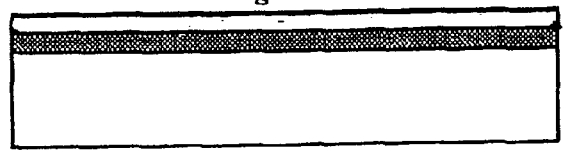
Figure 7C:
Figure 7D:
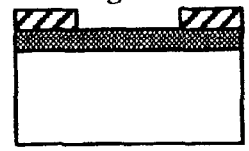

A lithography step is then performed by spin-coating the chip with photoresist (FIGS. 6C and 7C). The photoresist is then exposed through a desired mask with (lithography), and developed. This produces the structure of FIGS. 6D and 7D.

Figure 6E:
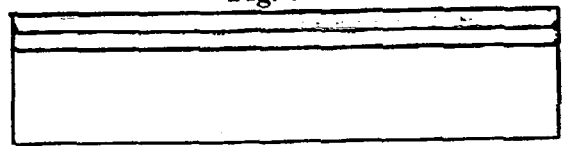
Figure 7E:
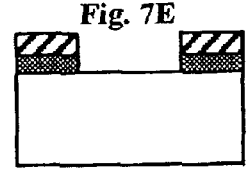

The uncovered region of the Al is then removed by etching with an Al-etcher until the glass substrate is exposed. This results in a structure where the substrate is selectively exposed in a pattern corresponding to the layout of waveguide(s) desired (FIGS. 6E and 7E).

Figure 6F:
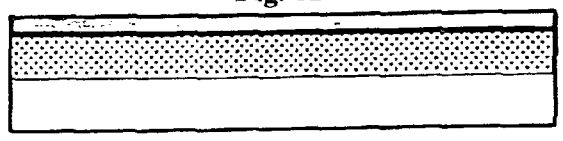
Figure 7F:
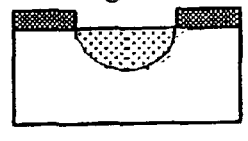

Next, the substrate is processed to form an ion-exchange waveguide within at least the portion of the exposed pattern adjacent to the edges of the chip. For ease of processing, the ion-exchange processing is performed over the entire exposed region of the substrate (FIGS. 6F and 7F). By way of example, the ion-exchange process may be performed by replacing $Na^+$ ions from the exposed glass area with Potassium $K^+$ ions from a $KNO_3$ melt by dipping the chip into molten $KNO_3$ salt (above its melting point of 385° C.) for about 40 min.

Next, prior to etching of the channels, a region of the substrate adjacent to edges which are to be used for input or output coupling with the waveguide are covered with a protective layer of photoresist. This may be achieved either by use of a simple mask with photolithography or by covering the entire sample with photoresist and then selective wiping out. The width of the strip should be chosen to define a sufficient length of secondary waveguide portions 20 to allow the input light to converge into a stable propagating mode. Although dependent upon various details of the implementations, a strip of about 1–3 millimeters adjacent to the edge of the chip is typically sufficient for this purpose.

Figure 6G:
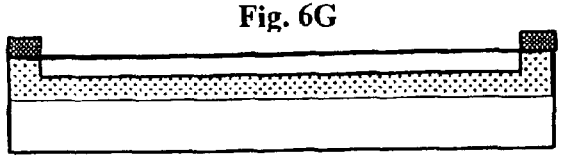
Figure 7G:
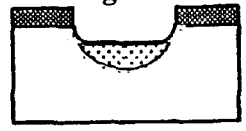

The exposed areas of the substrate are then etched, for example in a wet etcher using a solution with a molar ratio $(1HF:10N_4F):20H_2O$. The chip may be processed using repeated steps of etching and drying until a desired channel depth is achieved. The considerations for choosing the depth of the channel were discussed above. Typically, a depth of about 0.5 $\mu$m is preferred. The photoresist is then removed, for example by use of an acetone, and the Al mask is removed using an Al-etcher. The resulting structure is shown in FIGS. 6G and 7G. At this point, the chip edges are preferably polished to provide suitable surfaces for end coupling of waveguide inputs and outputs.

Figure 6H:
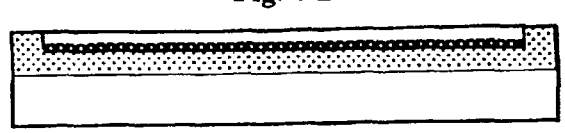
Figure 7H:

Finally, PVK (Poly-Vinil-Carbazole) polymer, or another polymer with high refractive index and low scattering losses, is spin-coated onto the substrate, and dried for 1 hour at 60° C. The PVK thickness is preferably set to less than the depth of the etched channels, and typically about 0.3 $\mu$m. The Final structure is illustrated in FIGS. 6H and 7H.

It will be appreciated that the above descriptions are intended only to serve as examples, and that many other embodiments are possible within the spirit and the scope of the present invention.

What is claimed is:

1. A waveguide structure comprising:
   (a) a substrate made from non-polymer material which is substantially transparent with a refractive index $n_1$ for electromagnetic radiation within at least one range of wavelengths, said substrate having an upper surface, at least one elongated channel being etched in said surface of said substrate, said elongated channel terminating at an end wall provided by said substrate; and
   (b) a polymer material deposited within, and extending along substantially the entire length of, said at least one channel so as to be optically coupled to said end wall, said polymer material being substantially transparent with a refractive index $n_2$ for electromagnetic radiation within said range of wavelengths, $n_2$ being greater than $n_1$ such that said polymer material defines a waveguide.

2. The waveguide structure of claim 1, wherein said elongated channel has at least one terminal portion adjacent to said end wall, said terminal portion defining a extension direction, wherein a region of said substrate extending from said end wall in said extensional direction is processed so as to exhibit a refractive index greater than $n_1$, thereby defining a secondary waveguide portion optically coupled to said waveguide.

3. The waveguide structure of claim 2, wherein said substrate includes a lateral surface located so as to delimit said secondary waveguide portion, said lateral surface being polished to a roughness of no more than about 0.1 $\mu$m.

4. The waveguide structure of claim 1, wherein said channel has a channel depth and wherein said polymer material is deposited within said channel as a layer having a thickness less than said channel depth.

5. The waveguide structure of claim 1, wherein said non-polymer material is selected from the group comprising: a glass material and a crystalline material.

6. The waveguide structure of claim 1, wherein said elongated channel has a substantially rectangular cross-section.

7. The waveguide structure of claim 1, wherein a cross-section of said elongated channel exhibits a concavely-rounded shape.

8. The waveguide structure of claim 1, further comprising a coating layer deposited over both said surface of said substrate and said polymer material, said coating layer having a refractive index smaller than $n_2$.

9. The waveguide structure of claim 1, wherein said substrate has a thickness measured perpendicular to said upper surface at least two orders of magnitude greater than a depth of said elongated channel.

10. A method for producing a polymer waveguide on a non-polymer substrate, the method comprising:
   (a) etching at least one channel in a surface of the substrate, said channel terminating at an end wall within the substrate; and
   (b) depositing a polymer material within said at least one channel so as to form a waveguide.

11. The method of claim 10, wherein said etching is performed via a mask defining said at least one channel.

12. The method of claim 10, wherein said etching is performed using a wet etching process.

13. The method of claim 10, wherein said etching is performed using a dry etching process.

14. The method of claim 10, wherein said depositing is performed using a substantially uniform deposition process.

15. The method of claim 10, wherein said depositing is performed using a spin-coating deposition process.

16. The method of claim 10, further comprising processing at least one region of the substrate through an ion exchange process so as to form a secondary waveguide adjacent to said at least one channel.

17. The method of claim 10, further comprising depositing a layer of coating material over both the surface of the substrate and the polymer material.

18. The method of claim 10, wherein said etching is performed to form a given channel depth, and wherein said depositing is performed so as to form a layer of said polymer material having a thickness less than said given channel depth.

19. The method of claim 10, wherein the substrate has a given thickness measured perpendicular to the surface of the substrate, and wherein said etching is performed to form a given channel depth, said given thickness being at least two orders of magnitude greater than said given channel depth.

* * * * *